US012654858B2

(12) United States Patent
Fagan et al.

(10) Patent No.: US 12,654,858 B2
(45) Date of Patent: Jun. 16, 2026

(54) AIRCRAFT SIDE LEDGE TABLE DEPLOYMENT SYSTEM

(71) Applicant: Textron Aviation Inc., Wichita, KS (US)

(72) Inventors: Stephen Howard Fagan, Wichita, KS (US); Paul Stokholm Warren, Valley Center, KS (US); Edward Francis Funke, Cheney, KS (US)

(73) Assignee: Textron Innovations Inc., Providence, RI (US)

( * ) Notice: Subject to any disclaimer, the term of this patent is extended or adjusted under 35 U.S.C. 154(b) by 200 days.

(21) Appl. No.: 18/421,724

(22) Filed: Jan. 24, 2024

(65) Prior Publication Data

US 2025/0236390 A1      Jul. 24, 2025

(51) Int. Cl.
*B64D 11/00*        (2006.01)
*A47B 5/04*         (2006.01)
*A47B 13/00*        (2006.01)

(52) U.S. Cl.
CPC ............... *B64D 11/00* (2013.01); *A47B 5/04* (2013.01); *A47B 13/00* (2013.01)

(58) Field of Classification Search
CPC ....... B64D 11/00; B64D 11/0605; A47B 5/04; A47B 13/00; A47B 3/14; A47B 5/006
See application file for complete search history.

(56) References Cited

U.S. PATENT DOCUMENTS

| | | | |
|---|---|---|---|
| 9,481,464 B2 | 11/2016 | Gow et al. | |
| 9,617,001 B2 | 4/2017 | Zimmermann et al. | |
| 9,731,829 B2 * | 8/2017 | Gow ...................... | B60N 3/004 |
| 9,938,016 B2 | 4/2018 | Hance | |
| 10,106,260 B2 * | 10/2018 | Gagnon ............. | B64D 11/0605 |
| 10,343,778 B2 | 7/2019 | Peuziat | |
| 10,442,537 B2 | 10/2019 | Satterfield | |
| 2009/0078169 A1 * | 3/2009 | Osborne ................ | B61D 37/00 |
| | | | 108/70 |
| 2010/0326331 A1 * | 12/2010 | St. Louis ............... | B64D 11/00 |
| | | | 108/44 |
| 2016/0221677 A1 * | 8/2016 | Hance ................ | B64D 11/0638 |
| 2016/0221678 A1 * | 8/2016 | Maillaut ............ | B64D 11/0638 |
| 2023/0046054 A1 * | 2/2023 | Harris ................ | B64D 11/0606 |
| 2023/0227162 A1 * | 7/2023 | Satterfield .......... | B64D 11/0638 |
| | | | 108/44 |

* cited by examiner

*Primary Examiner* — Daniel J Rohrhoff
(74) *Attorney, Agent, or Firm* — Avek IP, LLC

(57)            ABSTRACT

An aircraft side ledge table deploying mechanism including a table mounted to a pivot plate. The pivot plate being able to slide in a linear channel. The pivot plate is forced upwards by the release of a torsion spring. The torsion spring is able to be released when a lid is pivoted to a past open position. When the pivot plate translates upwards the table protrudes from an aircraft side ledge and a user may grasp the table and move it to a deployed position.

19 Claims, 18 Drawing Sheets

AIRCRAFT SIDE LEDGE TABLE DEPLOYMENT SYSTEM

CROSS-REFERENCE TO RELATED APPLICATIONS

None.

BACKGROUND OF THE INVENTION

1. Field

The disclosed embodiments relate generally to the field of aircraft interiors. More specifically, the disclosed embodiments relate specifically to aircraft interior tables and side ledges.

2. Description of the Related Art

It is known for an aircraft to have a tray or table. For example, in U.S. Pat. No. 9,617,001 to Zimmerman et al. discloses a holding device for a display in an aircraft. A spring is used to assist the movement of the device from a stowed position to a use position. A friction brake arrangement is used to produce a holding force when the holding arm is pivoted in and out.

It is also known for an aircraft to have an exit row table which defaults to a retracted position in case of an emergency. For example, U.S. Pat. No. 10,106,260 to Gagnon et al. discloses a lifting mechanism including a damper to assist in the removal of the table from a stowed position. A mechanism with rails guiding slides allows the table moving with the slides to move into a usable position.

It is also known for an aircraft to have a support extension for a screen which may be deployed and retracted. For example, in U.S. Pat. No. 10,343,778 to Peuziat describes an arm including first and second rigid segments jointed to pivot relative to one another to achieve a compact configuration. The support extension and screen are mounted in a console within the cabin of an aircraft.

It is also known for an aircraft to have a deploying table. For example, in U.S. Pat. No. 10,442,537 to Satterfield discloses an aircraft table including a mechanism employing a spring to lift the table from a stored position. A spring-loaded latch lever is connected to a pivot pin which allows the table to pop out from a recess.

It is also known for a spring mechanism to assist in the deployment of an aircraft table. For example, in U.S. Pat. No. 9,481,464 to Gow et al. discloses a table stowed in the armrest of an aircraft being deployed and moved to a presented position. The deployment of the table may be accomplished using a cable and spring mechanism or rack and pinion mechanism.

It is also known for an aircraft to have a table able to deploy and retract over a side ledge console. For example, in U.S. Pat. No. 9,938,016 to Hance discloses a table mounted over a side ledge console with a cover designed to upwardly close off the housing at the deployment opening in the retracted position of the table. When retracted, the table pushes down a elastic biasing system.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages will be apparent from the following detailed description of the embodiments and the accompanying drawing figures.

In some embodiments, the techniques described herein relate to an aircraft table deployment system including: a lid arm operatively connected on a first end to a lid and on a second end pivotally connected to a first end of a cam rod; the cam rod being pivotally connected on a second end to a pivotally mounted cam; a table supported in between a first linear guide channel and a second linear guide channel wherein the first linear guide channel and the second linear guide channel are linearly aligned and directly oppose each other; the table being operatively connected to at least one torsion spring wherein the torsion spring forces the table to a deployed position; the lid pivoting to a past open position and pivoting the cam allowing the torsion spring to drive the table to the deployed position.

In some embodiments, the techniques described herein relate to an aircraft working surface deployment system, the system including: a working surface wherein the working surface is concealed within a cavity and supported by a linear guide channel aligned in a single plane; the working surface being operatively coupled to at least one torsion spring wherein the torsion spring forces the working surface to escape from the cavity; a cam pivotally mounted to the linear guide channel wherein the cam pivots to locked and unlocked orientations; the cam being pivoted to an unlocked orientation when a lid is pivoted to a past open position allowing the torsion spring to force the working surface to escape from the cavity.

In some embodiments, the techniques described herein relate to an aircraft working surface deployment system, the system including: a lid operatively connected to a cam rod wherein the lid is operatively connected to a first end of the cam rod; a cam pivotally mounted to a second end of the cam rod wherein the cam is engaged with a working surface in a locked orientation; the working surface supported by a linear guide channel wherein the working surface tracks along the linear guide channel in a single plane; the lid being able to pivot to a past open position to shift the cam rod and pivot the cam to disengage with the working surface in an unlocked orientation.

BRIEF DESCRIPTION OF SEVERAL VIEWS OF THE DRAWINGS

Illustrative embodiments are described in detail below with reference to the attached drawing figures, which are incorporated by reference herein and wherein.

Figure 1:
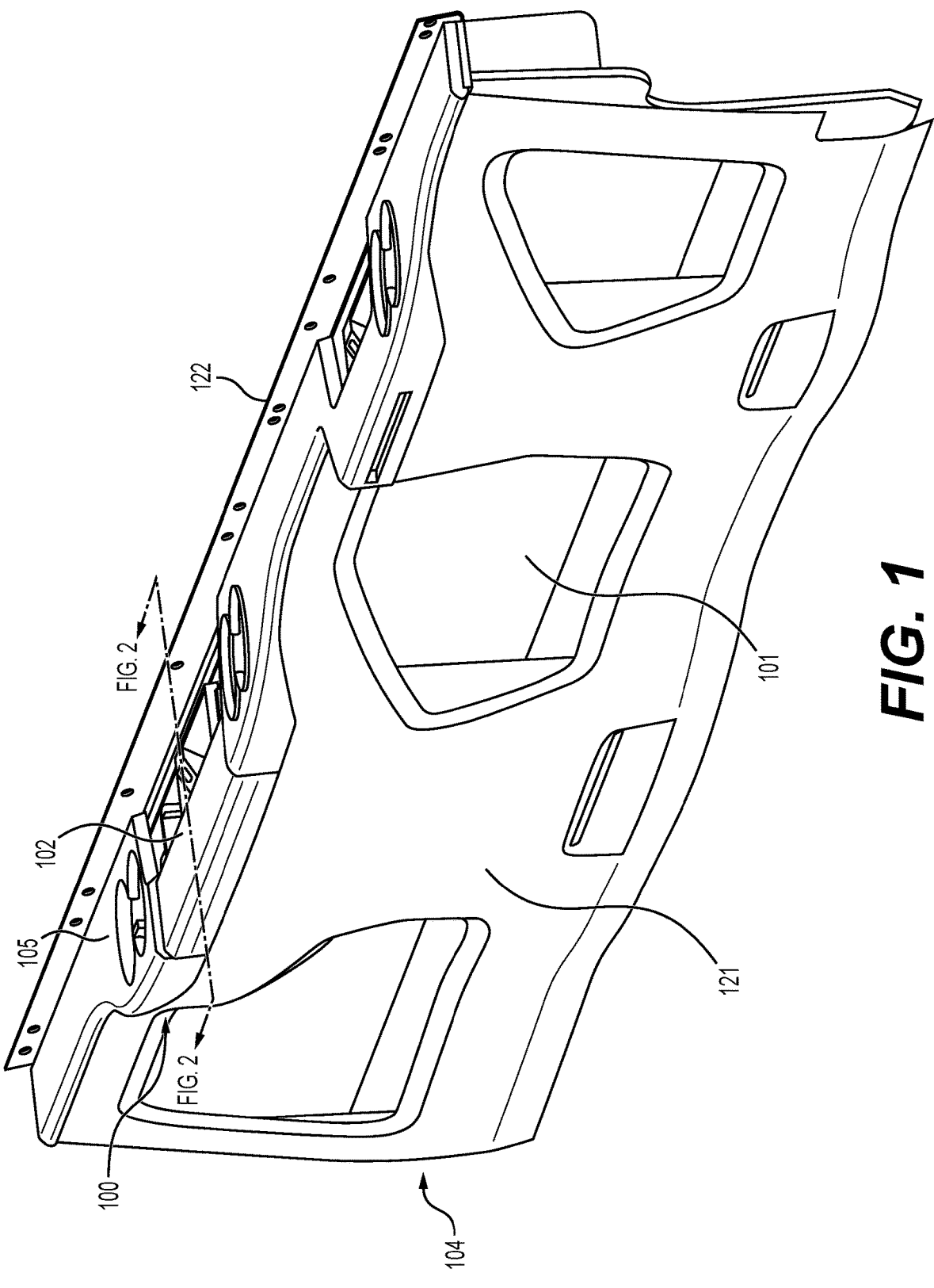
FIG. 1 is a side perspective view of the aircraft side ledge table deployment system with the lid in a closed position.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the technology can include a variety of combinations and/or integrations of the embodiments described herein.

Embodiments disclosed herein provide a system for deploying an aircraft table. On aircraft, a table integrated to retract within a side ledge of an aircraft cabin is advantageous because of the minimal space the table occupies when it is retracted and not in a usable position. In current arrangements, springs and wires are used within the side ledges of an aircraft to assist a passenger attempting to deploy a table. These methods are disadvantageous due to the possibility of mechanism being triggered causing a table to self-deploy due to shaking aboard an aircraft due to turbulence. In other arrangements, a latching mechanism is incorporated to prevent a table from self-deploying, but locking mechanisms can be cumbersome and complex for users to operate while also increasing the weight and occupying space of the table. Current table deployment methods also involve the uses of non-linear tracks within side ledges. Nonlinear tracks can make the deployment of the table jerky or stiff at points to a user deploying a table while also increasing gear wear and creating noise. A system is needed to reduce the complexity of a latching mechanism and incorporate linear tracks into a side ledge to make table deployment easier for a user, while also minimizing space needed for the table mechanism.

Within embodiments is a table deployment mechanism designed to be incorporated into a side ledge of an aircraft. The table deployment mechanism incorporates a lid with hinges and spring-loaded shocks or dampers to force the lid to be in a fully closed or fully open position. Once a user forces the lid to a past open position, a linkage is actuated which releases latches or locks that were holding a pivot plate in a stowed position. The locks are spring loaded in the latched position to release the pivot plate when the lid is opened to a past open position. The deployment mechanism uses straight linear guides or gear rack channels which allow the user to have a consistent feel when deploying or retracting the table. When the table is retracted to a stowed position, a torsion spring(s) is tensioned so when the table is returned to a deployed position the table will pop up when the latches are disengaged.

FIG. 1 shows a perspective view of an aircraft side ledge 104 equipped with a table deployment mechanism 100. The table deployment mechanism 100 includes a lid 102 covering the cavity where the table deployment mechanism 100 is configured internally within the aircraft side ledge 104. The components of the table deployment mechanism 100 are located internally within the aircraft side ledge 104 and are not visible in an external view like FIG. 1. The lid 102 is shown in FIG. 1 to be in a closed position or a position in which the lid 102 is horizontal and may be flush with the top panel 105 of the aircraft side ledge 104. The aircraft side ledge 104 includes an inboard furniture panel 121 providing a front side for the table deployment mechanism 100 and a rear mounting panel 101 extending behind the aircraft side ledge 104 and providing a backing for the table deployment mechanism 100. The rear mounting panel 101 includes fastener holes 122 so that a fastening member such as a screw or bolt may be inserted to secure the side ledge 104 to the aircraft fuselage structure (not shown).

Figure 2:
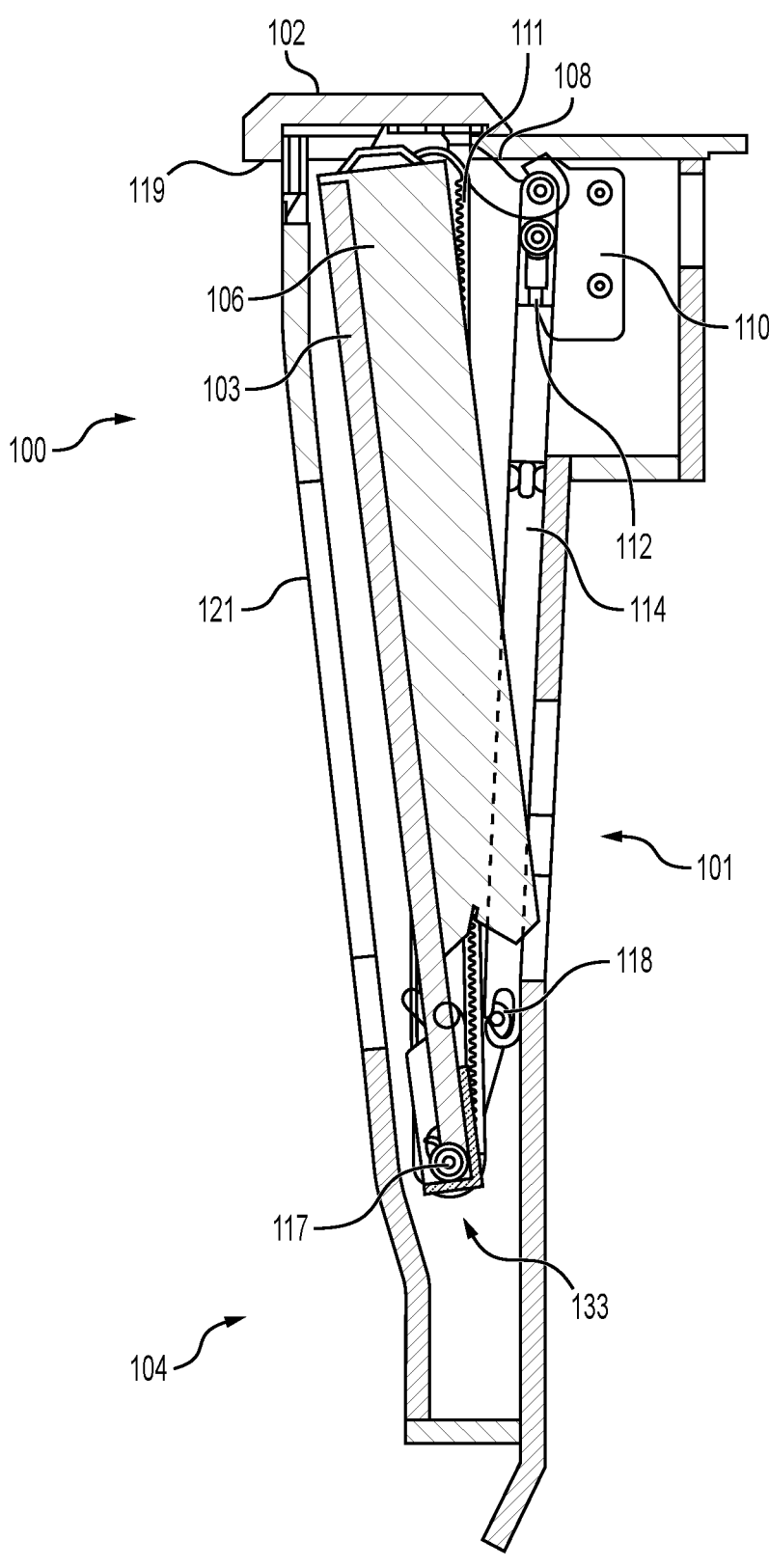
FIG. 2 is a cross sectional view of the aircraft side ledge table deployment system of FIG. 1 with the lid in a closed position.
Figure 12:
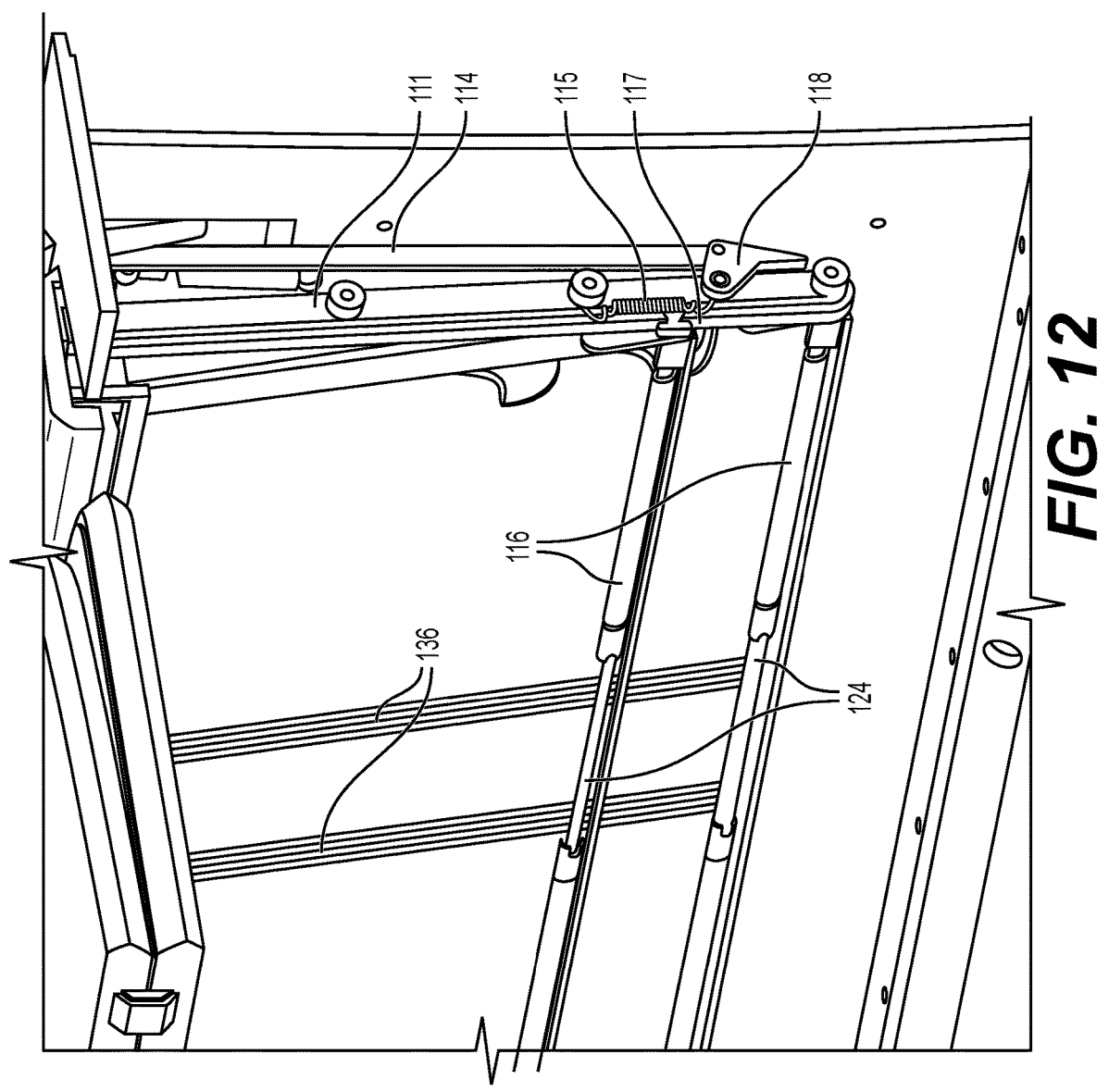
FIG. 12 is an internal perspective view of the aircraft side ledge table deployment system.

FIG. 2 is a cross-sectional view of the table deployment mechanism 100, taken along the line 2-2 of FIG. 1, with the lid 102 being in a closed position. The lid arm 108 is L-shaped and on a first end includes a mounting bracket attached to the lid 102 and on a second end is coupled to a cam rod 114 and a lid hinge mount 110. The lid arm 108 is configured to pivot on the lid hinge mount 110 to allow the lid 102 to pivot to open, past open, and closed positions. The lid hinge mount 110 includes a damper housing 112. The damper housing 112 assists a user in closing or opening the lid 102 and ensures the lid 102 to be only in a fully closed or fully open position. The damper housing 112 allows the lid 102 to be closed only to a fully closed or opened to a fully open position which prevents the lid 102 from bouncing and a table 106 from accidentally being deployed during turbulence. In embodiments, the damper housing 112 may include an actuator or a spring. The table 106 is shown in a stowed position internally within a cavity 133 of the aircraft side ledge 104. In embodiments, the cavity 133 is formed from the inboard furniture panel 121 and the rear mounting panel 101 which include angled components substantially allowing the cavity 133 to be V-shaped with a larger available area near the top of the cavity 133 compared to the bottom. The table 106 is mounted to a pivot plate 103. Pivot plate 103 spans the length of the table 106 and is positioned and mounted to an underside surface of the table 106 in embodiments. Pivot plate 103 is attached to the table 106 and configured to track upwards or downwards within the aircraft side ledge 104 on a linear guide channel 111. The table 106 substantially moves with pivot plate 103. The linear guide channel 111, optimally viewed in FIG. 8, spans linearly in a vertical direction in the cavity 133 within the aircraft side ledge 104. The linear guide channel 111 allows pivot plate 103 and the mounted table 106 to slide or track up or down as the table 106 is moved to a deployed or stowed position by a user. The linear alignment of the linear guide channel 111 allows for the table 106 to track in a single plane. The linear guide channel 111 may include teeth along its inner side to allow for pivot plate 103 to track within the linear guide channel 111. Pivot plate 103 is connected on one end to a torsion spring 116 (FIG. 12). The torsion spring 116 as best viewed in FIG. 12 may include one or more springs configured along the bottom of the cavity 133 spanning across the length of the cavity 133. In some embodiments additional torsion springs 116 could be used. In FIG. 2 the torsion spring 116 is in a fully loaded position because the table 106 is in a stowed position. The torsion spring 116 is attached to a load bearing pivot mount 117 which fixes one end of the torsion spring 116 to pivot plate 103. The opposite end of torsion spring 116 is fixed to a torsion shaft 124 which in some embodiments winds or unwinds the torsion spring 116 as the table 106 is moved. The pivot mount 117 is configured on a side edge of pivot plate 103 and allows pivot plate 103 to track within the linear guide channel 111. The pivot mount 117 may be a gear or another bearing being rotatable to track within the linear guide channel 111.

Figure 17:
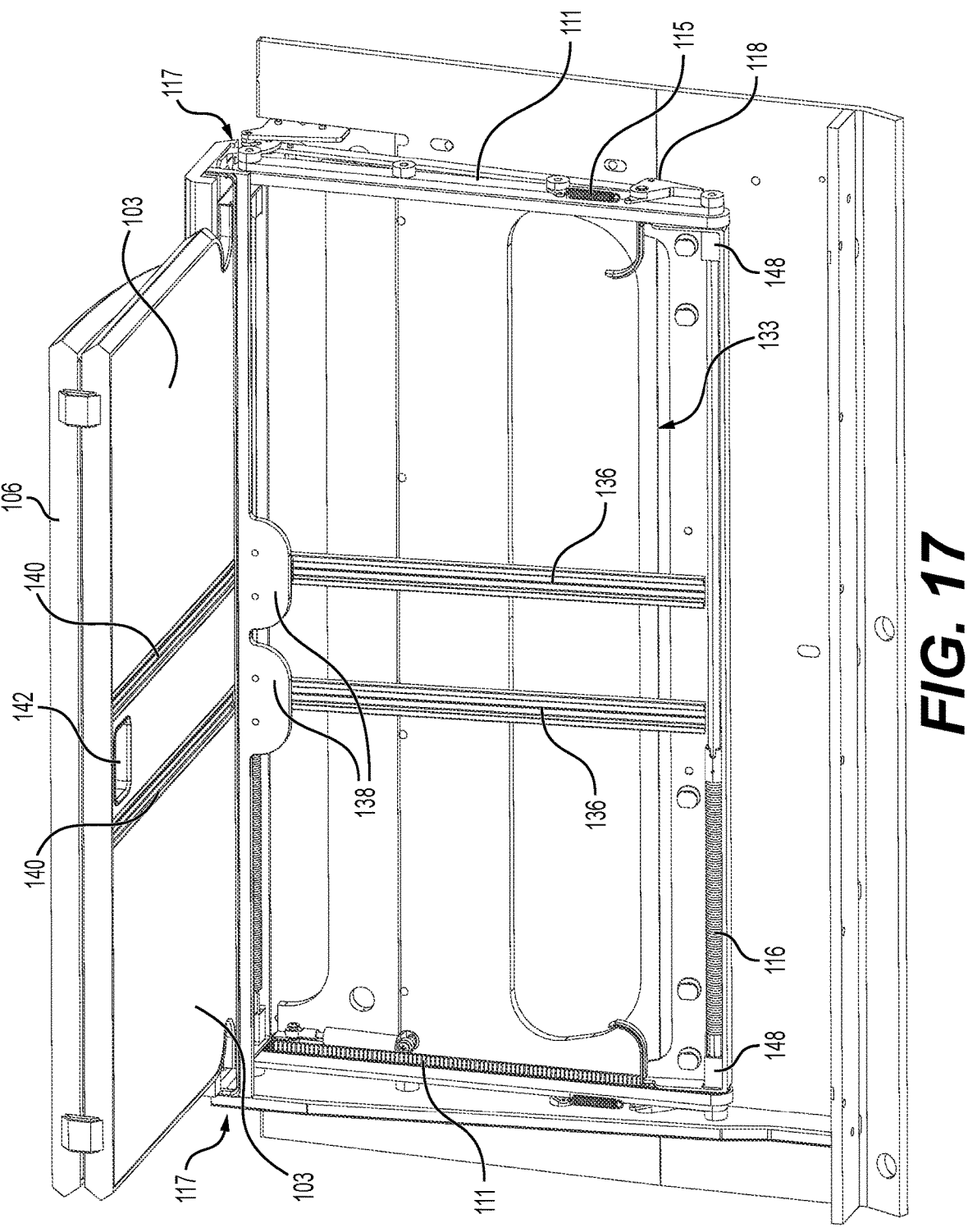
FIG. 17 is an internal view of the aircraft side ledge deployment system with an inboard furniture panel removed.
Figure 18:
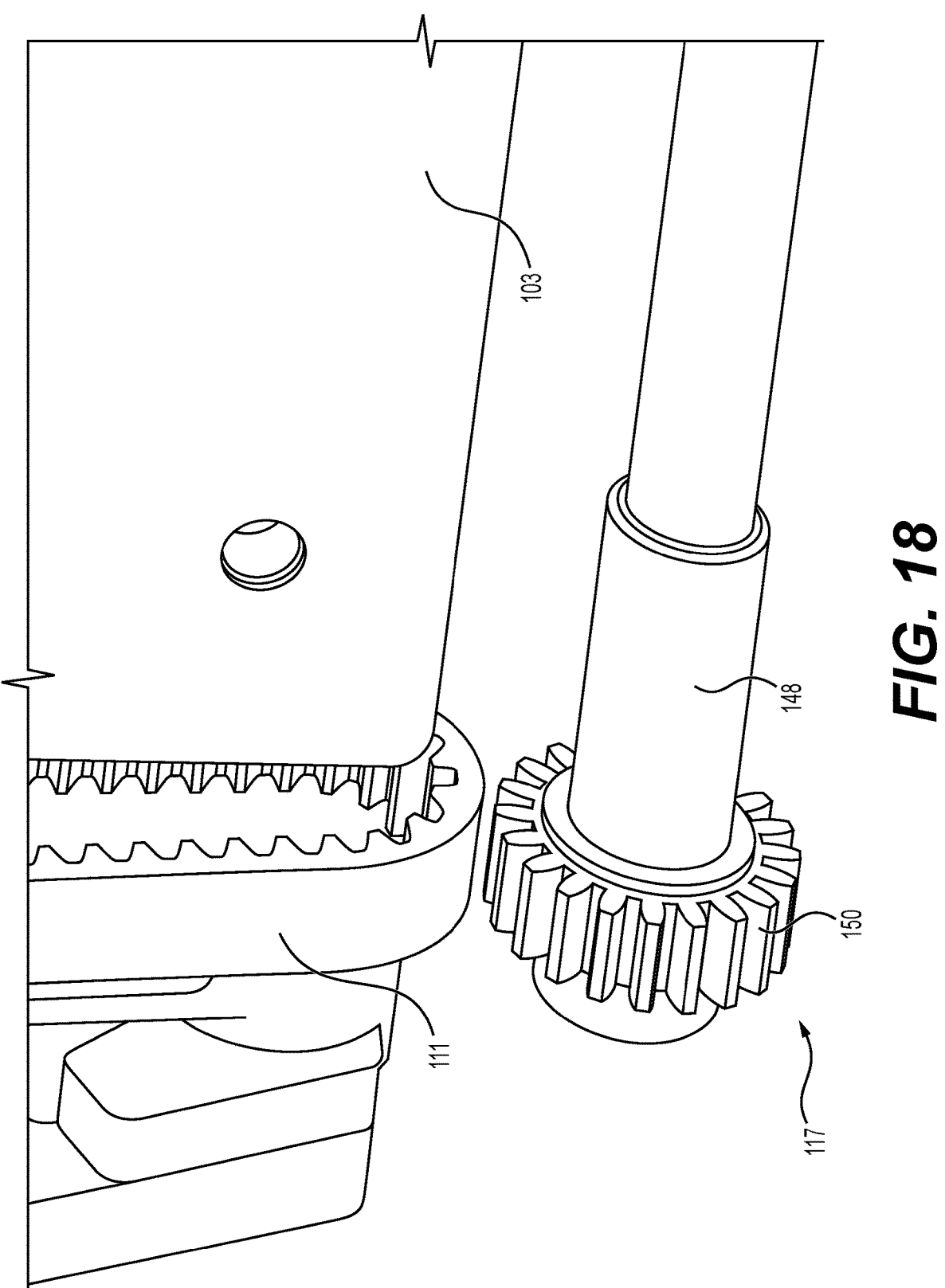
FIG. 18 is a close-up view of a pivot mount removed from a linear guide channel of the integrated side ledge.

FIG. 18 shows a close-up view of one pivot mount 117 removed from the linear guide channel 111. In embodiments, the pivot mount 117 includes a gear 150 configured with a bearing 148 which enables the pivot plate 103 to track with the gear 150 as the gear 150 tracks in each linear guide channel 111. FIG. 17 shows the bearing 148 adjacent to a torsion spring 116 which may be used to drive the pivot plate 103 and table 106 out of the pocket 133.

The linear guide channel 111 is configured with an extension spring 115 (FIG. 12). The extension spring 115 connects on a first end to an outer side of the linear guide channel 111 and on a second end to a cam 118. The extension spring 115 is configured to hold the cam 118 in a locked orientation which is an orientation preventing the torsion spring 116 from driving the pivot mount 117 upwards in the linear guide channel 111. The cam 118 includes a cam rod 114 extending from the lid arm 108 to the cam 118 which substantially controls the orientation of the cam 118.

Figure 13:
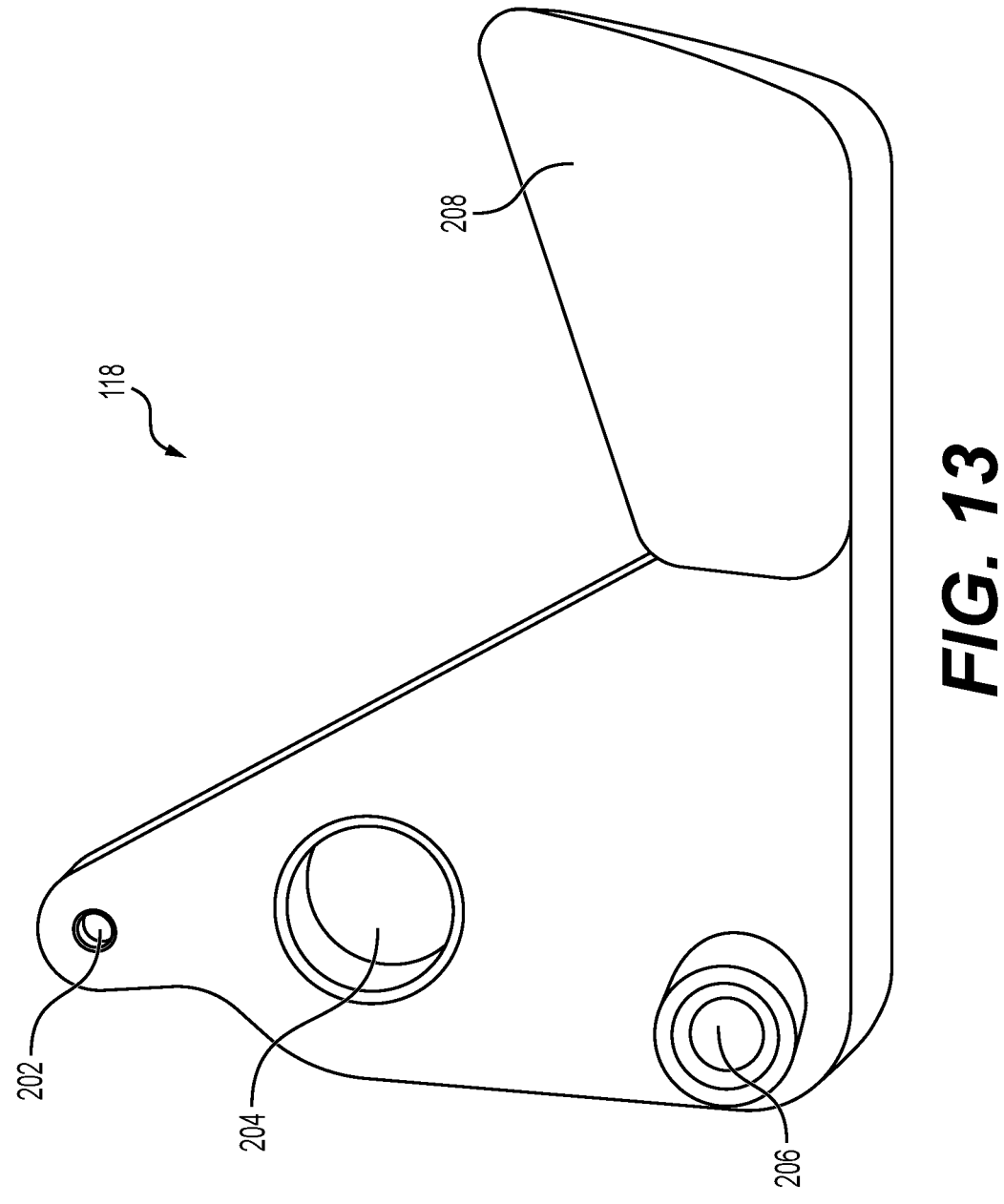
FIG. 13 is a top view of the cam used for the aircraft side ledge table deployment system.

Shown in FIG. 13 the cam 118 is L-shaped and on one end includes an extension spring hole 202 where the extension spring 115 is attached and a linear guide channel hole 204 allowing the cam 118 to be rotatably attached to an outer side of the linear guide channel 111. Near the center of the L-shape the cam 118 includes a cam rod extension 206 configured to allow the cam rod 114 to attach to the cam 118. On its other end the cam 118 includes a tabbed end 208 shaped to function as a tab which is sized and configured to engage with the table 106, pivot mount 117, or pivot plate 103 to prevent or allow the table 106 to deploy. In this way, the cam 118 functions as a stow lock which, when engaged, prevents the deployment of the table 106. The cam 118 is only able to become unlocked when the lid 102 is opened to a past open position causing the cam rod 114 to shift upwards and tensioning the extension spring 115 and forcing the cam 118 to pivot to an unlocked orientation. Since the torsion spring 116 is in a loaded position when the table 106 is stowed, the torsion spring 116 will want to release and pop out the table 106. The cam 118 prevents the table 106 from popping up when it is in a locked orientation as shown in FIG. 2.

Figure 3:
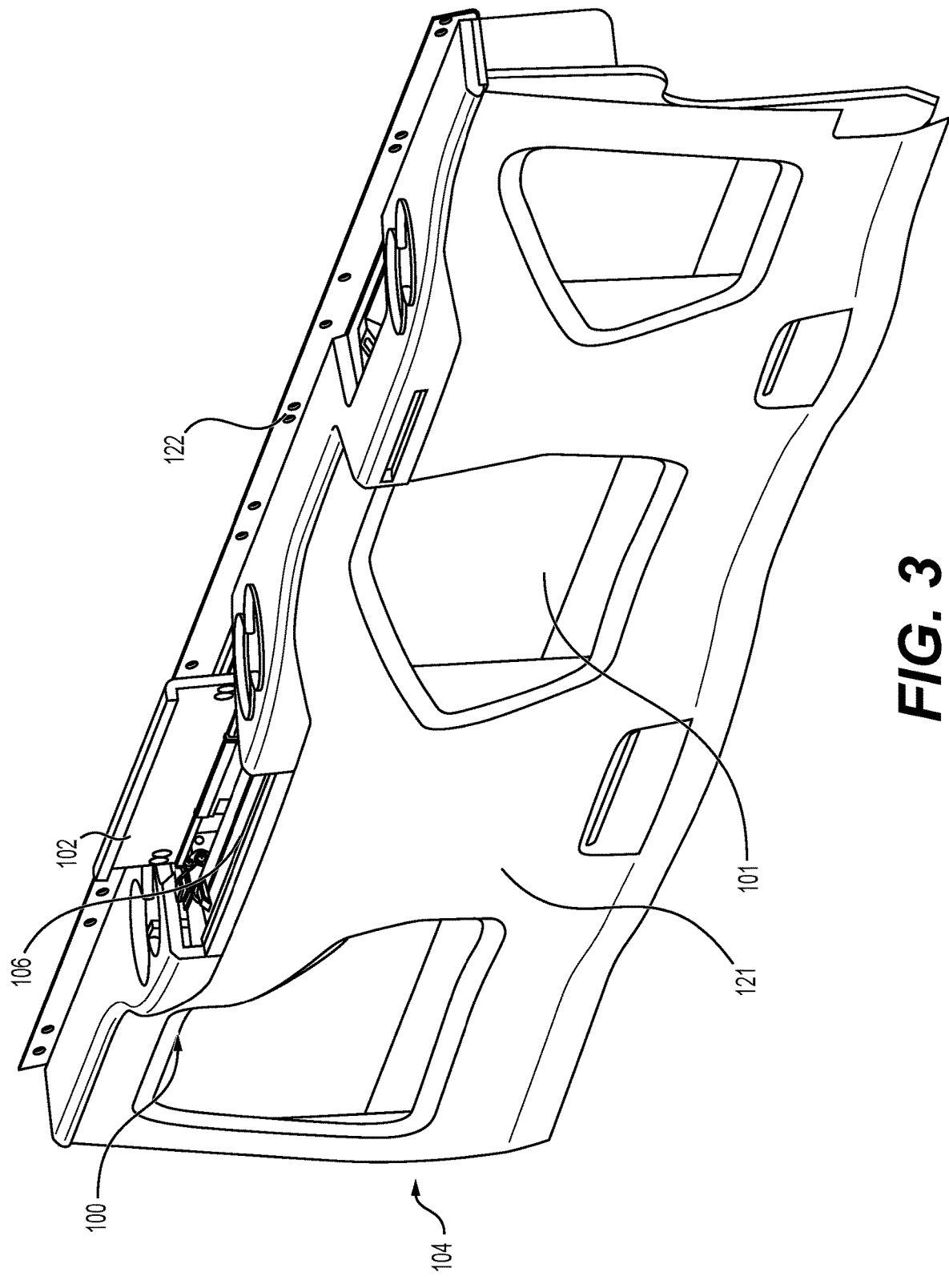
FIG. 3 is a side perspective view of the aircraft side ledge table deployment system with the lid in an open position.

Shown in FIG. 3 the table deployment mechanism 100 is shown with the lid 102 moved to an open position. The lid 102 may be pivoted to an open position when a user applies an upward force to the lip extension 119 extending over the edge of the aircraft side ledge 104. The lid 102 is defined to be in an open position when the lid is substantially oriented perpendicular to the top surface of the aircraft side ledge 104. The table 106 remains in a stowed position concealed within the aircraft side ledge 104.

Figure 4:
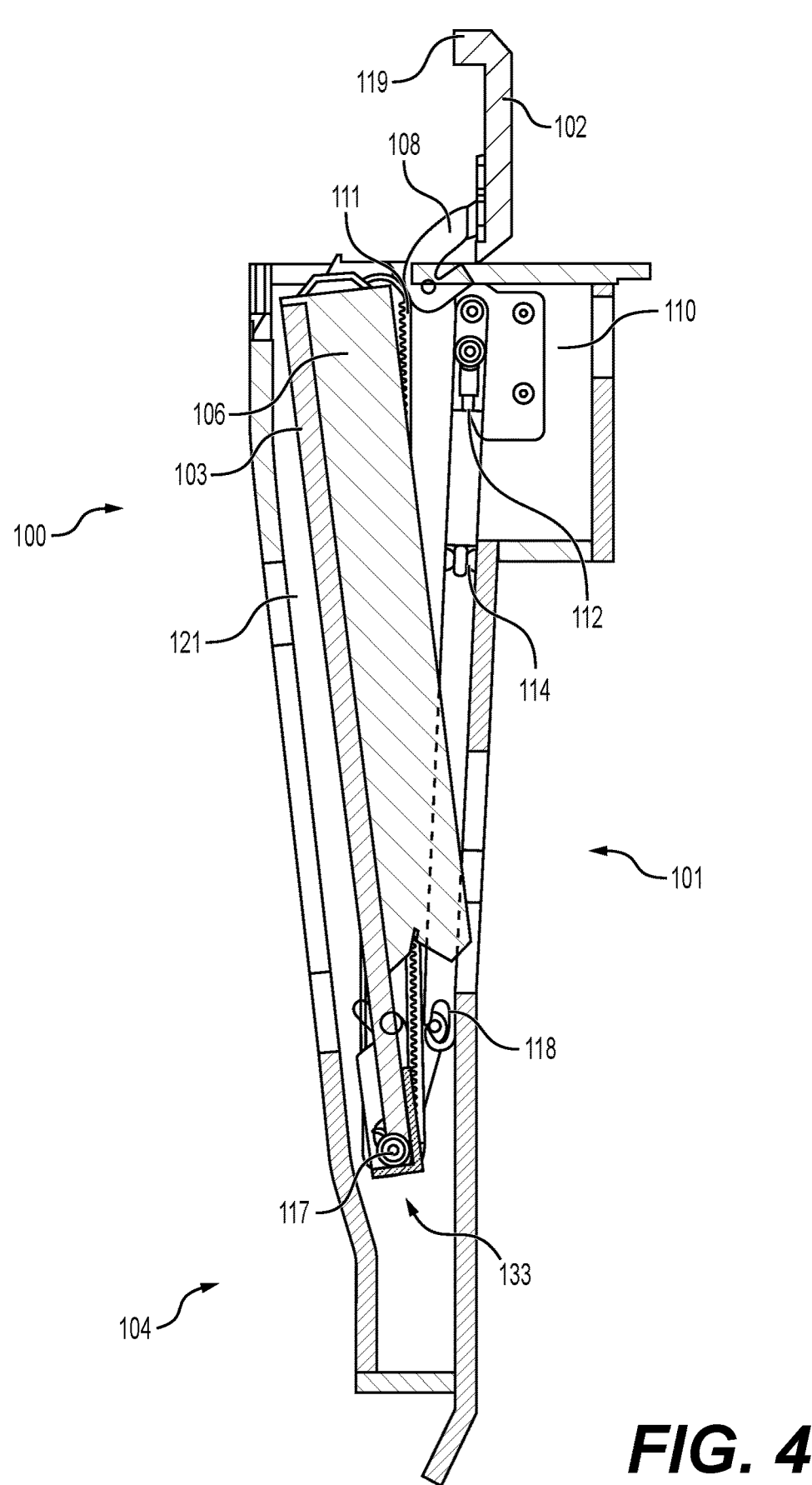
FIG. 4 is a cross sectional view of the aircraft side ledge table deployment system of FIG. 1 with the lid in an open position.

Shown in FIG. 4 the table deployment mechanism 100 is shown in a cross-sectional view taken along the line 2-2 of FIG. 1, with the lid 102 pivoted to an open position. The damper housing 112 or the spring or actuator configuration assists a user opening the lid 102 so that the lid 102 reaches a fully opened position as defined above. With the lid 102 opened the table 106 is still within the aircraft side ledge 104. The cam rod 114 does not move when the lid 102 is opened and allows the cam 118 to remain in a locked orientation and with the tabbed end 208 engaged with the table 106, preventing the table 106 from popping up and out from the cavity 133 due to the loaded torsion spring 116.

Figure 5:
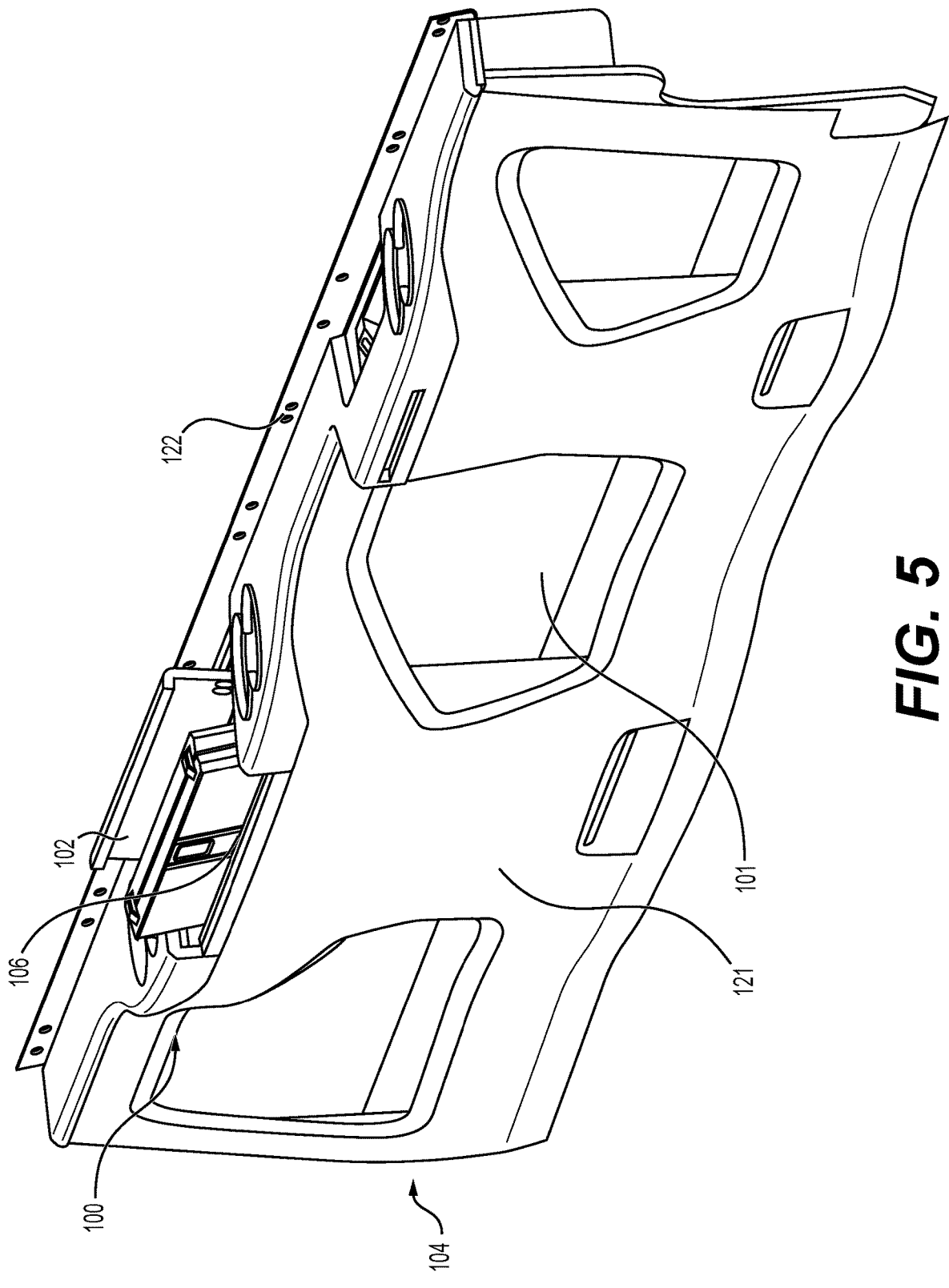
FIG. 5 is a side perspective view of the aircraft side ledge table deployment system with the table protruding out from the aircraft side ledge.

Shown in FIG. 5 in a perspective view the lid 102 is opened to a past open position. The lid 102 may achieve a past open position by a user pivoting the lid 102 past its open position (the open position shown in FIG. 4). When the lid 102 is pivoted to a past open position the table 106 pops out of the aircraft side ledge 104.

Figure 6:
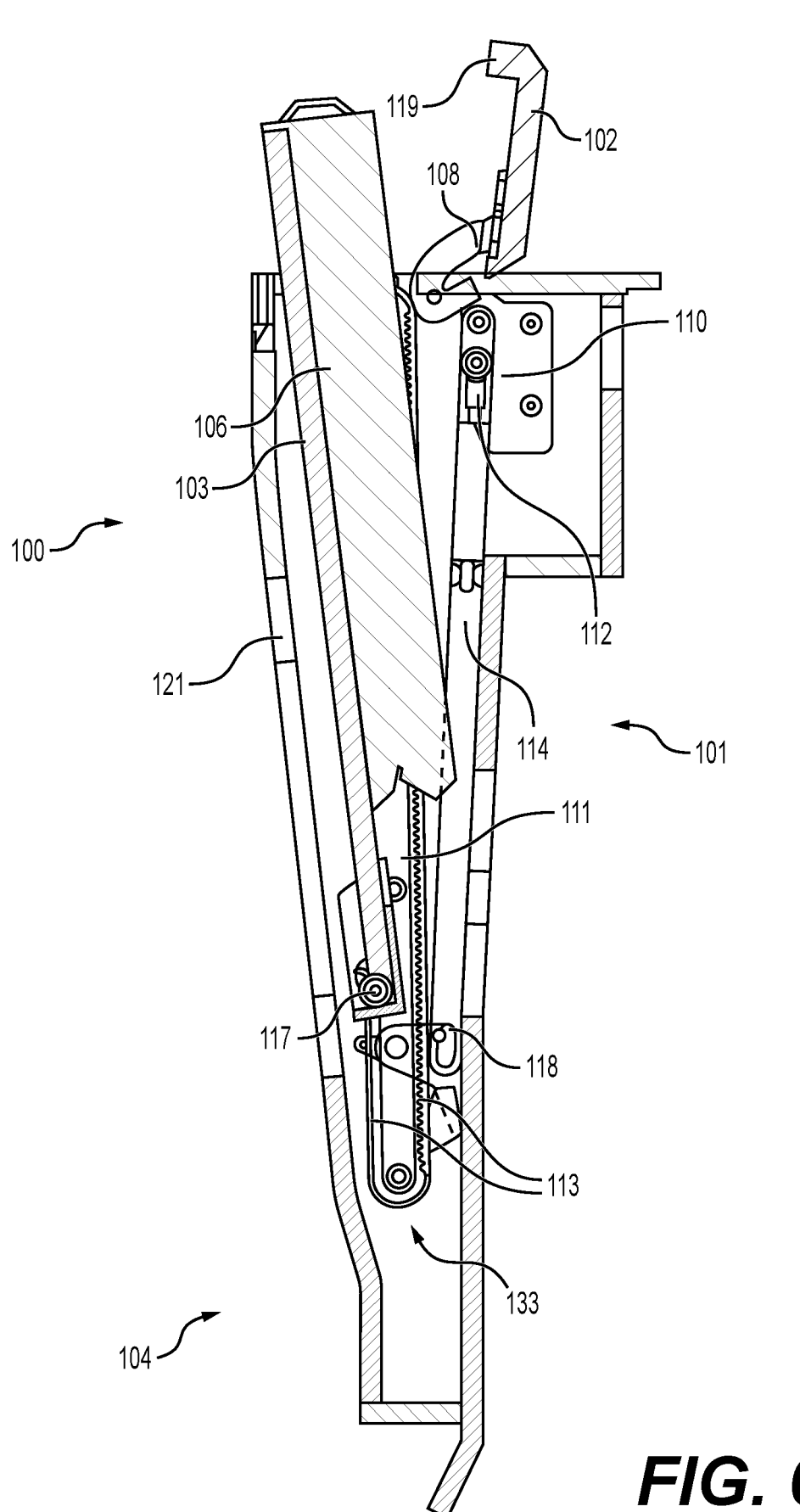
FIG. 6 is a cross sectional view of the aircraft side ledge table deployment system of FIG. 1 with the table protruding out from the aircraft side ledge.

Shown in FIG. 6 in a cross-sectional view the lid 102 is pivoted to a past open position. The damper housing 112 only allows for the lid 102 to be in the open position such that a user must apply force to open the lid 102 to a past open position. When the lid 102 is pivoted to a past open position, the cam rod 114 attached to the lid arm 108 shifts upwards within the cavity 133 pivoting the cam 118 and disengaging the tabbed end 208 allowing the table 106 to become unlocked and move upwards due to the tension in the torsion spring 116. The table 106 is driven upward due to the torque in the torsion spring 116 being unloaded and driving pivot plate 103 upwards in the linear guide channel 111. Pivot plate 103 slides up in a straight and linear path within the linear guide channel 111 created by the linear guide channel siding 113. The linear guide channel siding 113 may include rollers, gears, or sliders positioned on an inner surface of the linear guide channel 111, which substantially creates a linear channel to allow the pivot mount 117 to slide up and escape the table 106 from the top surface of the aircraft side ledge 104. In some embodiments, the table 106 may be a working surface configured protrude and escape from the cavity 133.

Figure 7:
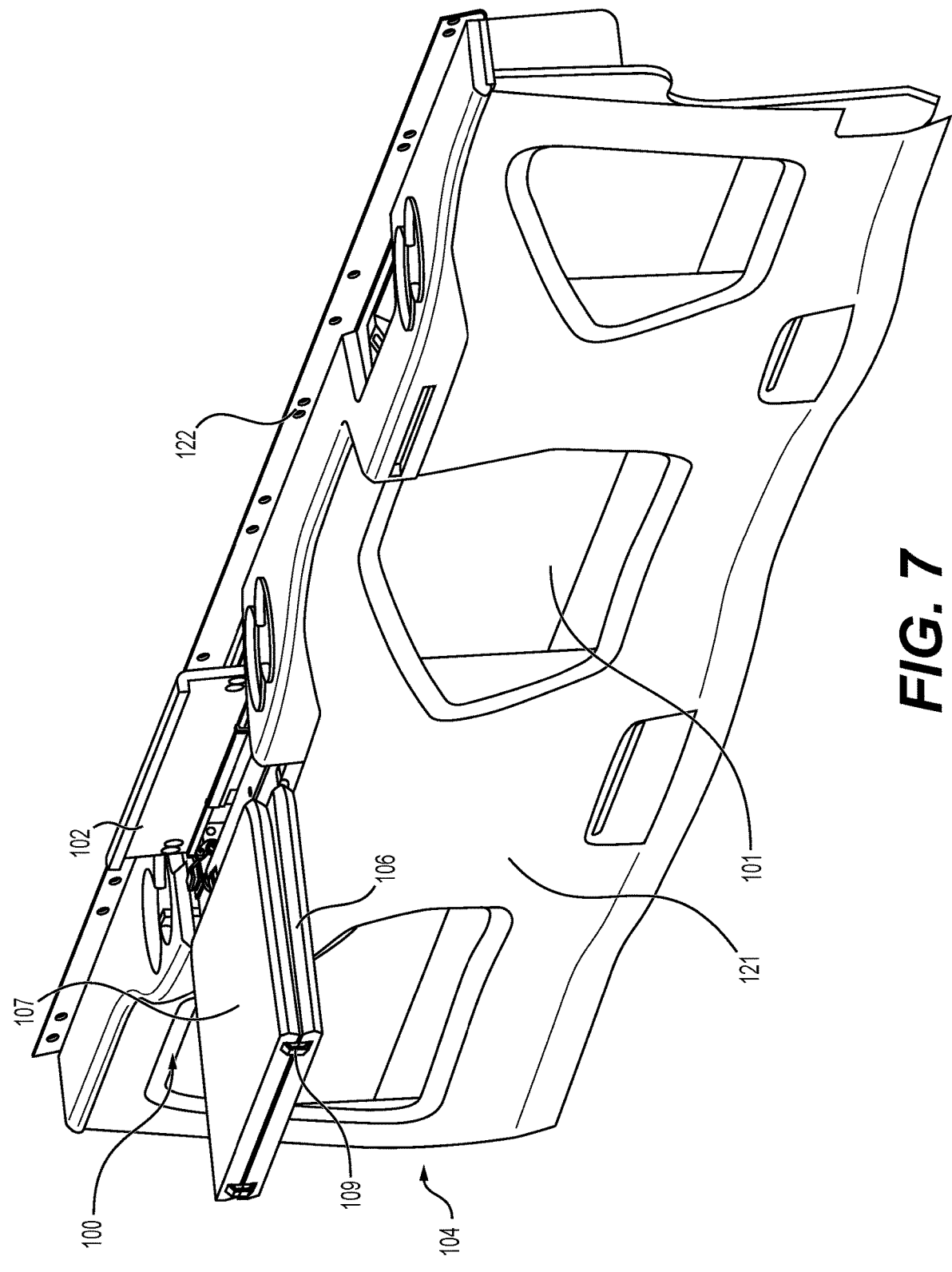
FIG. 7 is a side perspective view of the aircraft side ledge table deployment system with the table in a partially deployed position and the lid open.

Shown in FIG. 7 the table 106 is in a partially deployed position with the lid 102 being returned to an open position.

Figure 11:
FIG. 11 is a side perspective view of the aircraft side ledge table deployment system with the table in a fully deployed position and the lid closed.

The table 106 is defined to be in a partially deployed position when fully removed from the aircraft side ledge 104, but with the table extension 107 not extended. In this view, the table 106 includes hinges 109. The hinges 109 allow for the table extension 107 to pivot and rotate which extends the table 106 surface length (FIG. 11).

Figure 8:
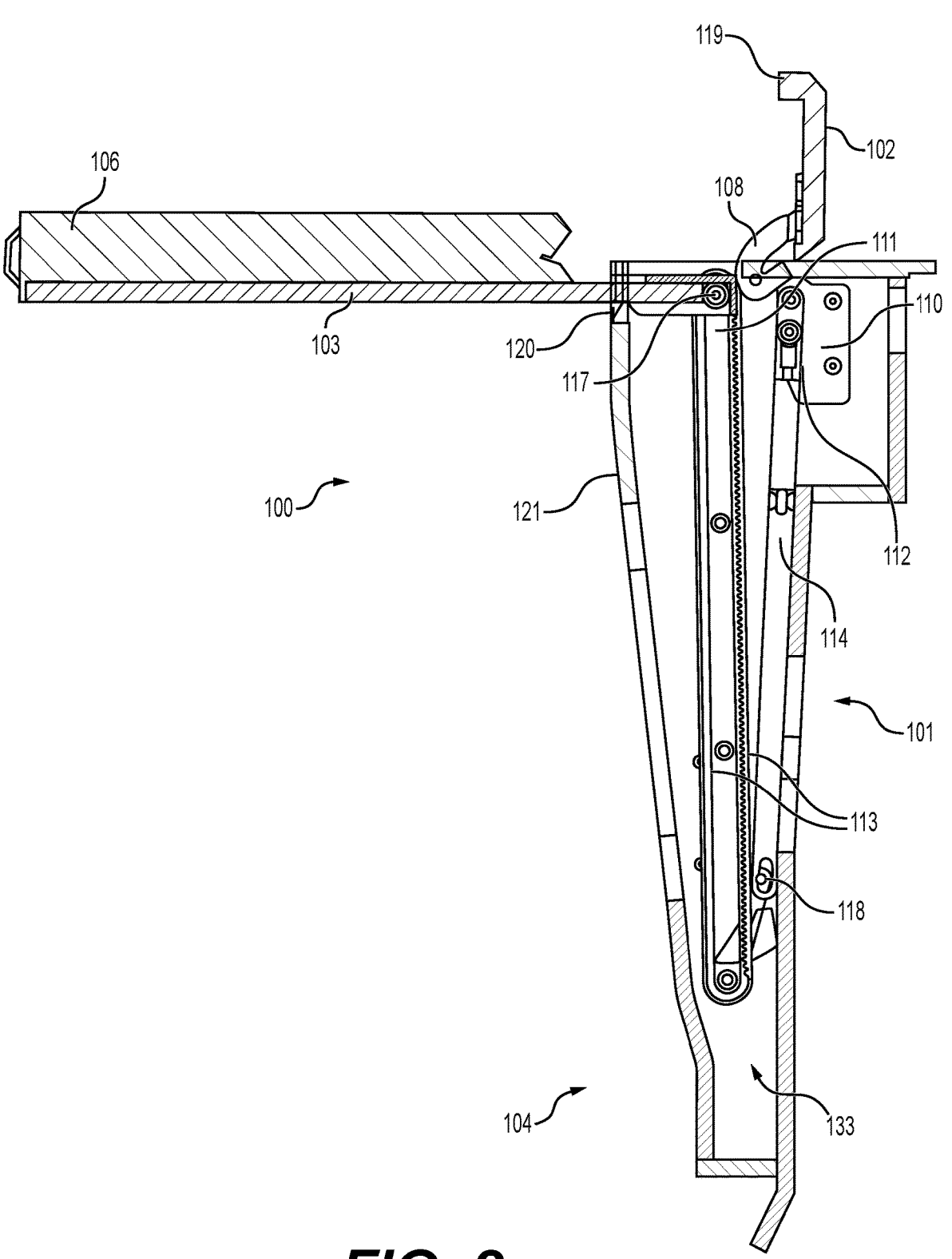
FIG. 8 is a cross sectional view of the aircraft side ledge table deployment system of FIG. 1 with the table in a partially deployed position and the lid open.

FIG. 8 shows a cross sectional view of the table 106 partially deployed with the lid 102 in an open position. Pivot plate 103 is attached to the underside surface of the table 106 and is engaged to the linear guide channel 111 at the top of the linear guide channel 111. The pivot mount 117 allows pivot plate 103 to remain engaged in the linear guide channel 111 and pivot the table 106 outwards to a deployed position. The pivot mount 117 and the edge support 120 provide support for the table 106 when the table 106 is extended to a partially deployed or a fully deployed position.

Figure 14:
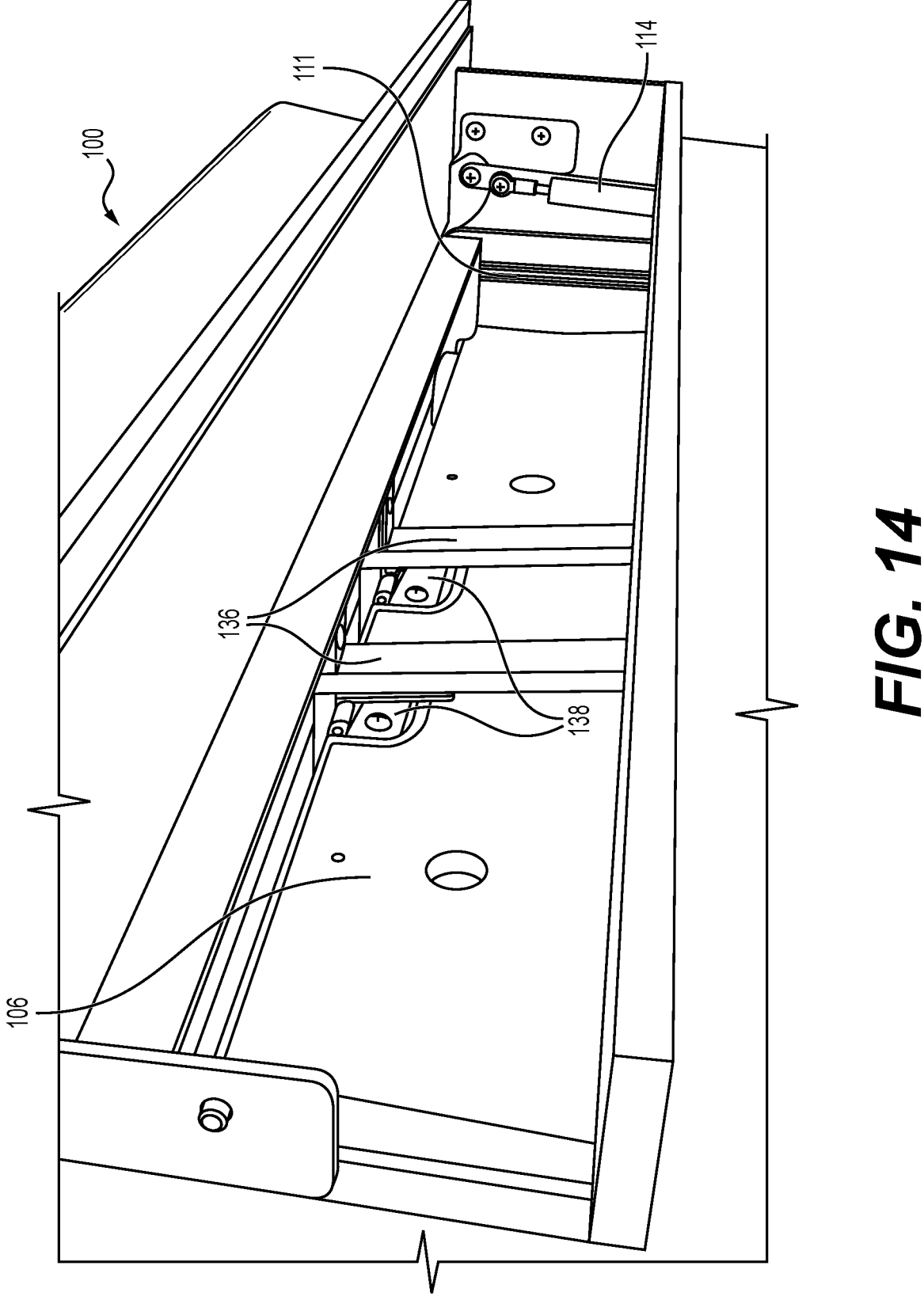
FIG. 14 is an internal perspective view of the aircraft side ledge table deployment system.
Figure 15:
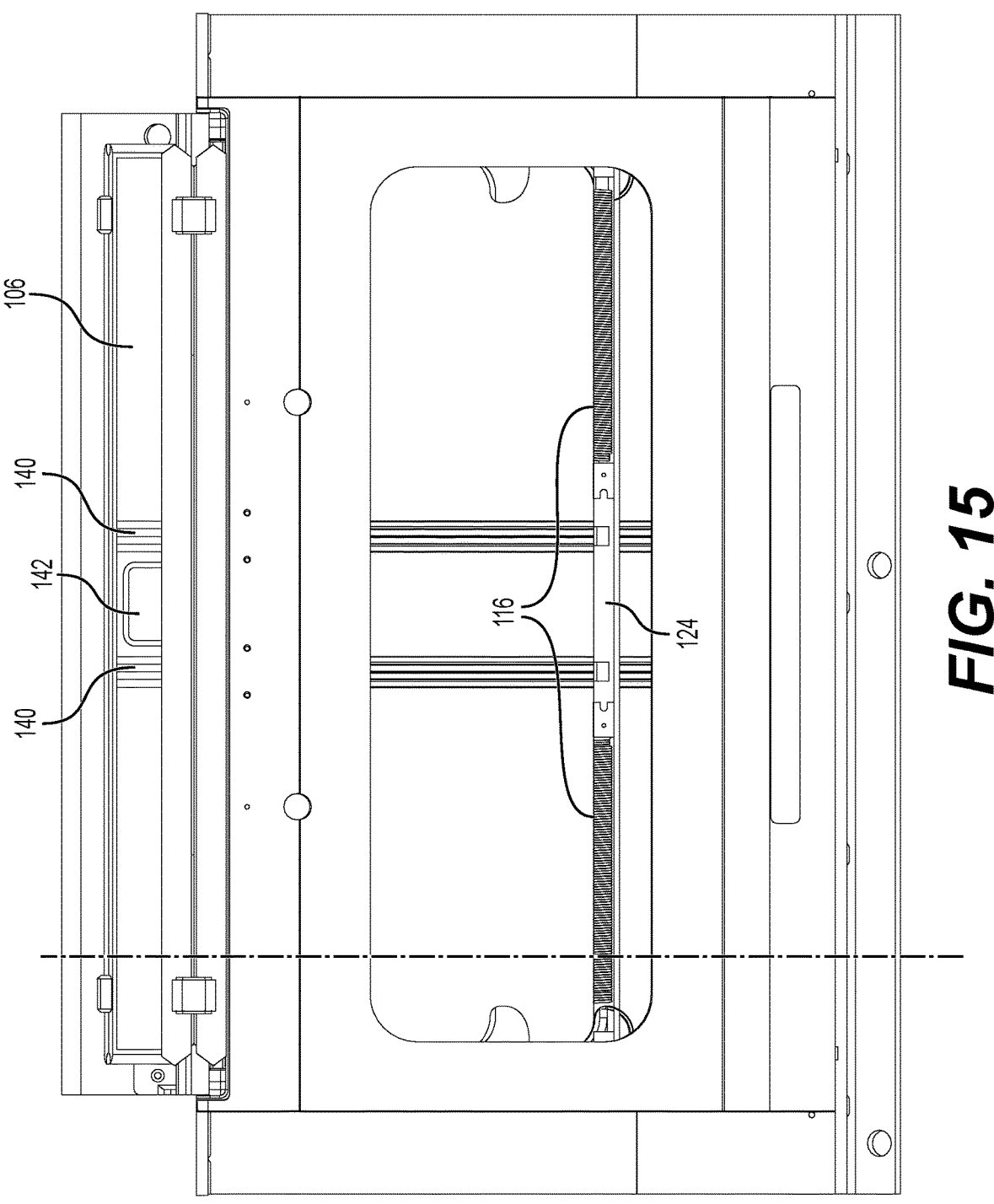
FIG. 15 is a partially internal front view of the aircraft side ledge table deployment system of FIG. 1.

FIGS. 12, 14, and 15 show a perspective internal view of the table deployment mechanism 100 which includes linear guide rails 136 mounted to the inboard furniture panel 121. The hinges 138 are configured with linear sliders to attach and engage the linear guide rails 136. The hinges 138 may be a piano hinge or a similar type of hinge and are mounted to the upper edge of the aircraft side ledge 104 and may substantially form the edge support 120. The guide rails 136 are mounted to hinges 138 positioned on the underside of the pivot plate 103. The hinges 138 allow the pivot plate 103 and table 106 to pivot once removed from the cavity 133. When in a stowed position the hinges 152 substantially align with the guide rails 136 such that the table 106 may be supported while being tracked along the linear guide channels 111. The hinges 138 and guide rails 136 substantially prevent the table 106 from pivoting until the end of the linear guide channel 111 is reached such that the table 106 surface may be prevented from contacting the interior surfaces of the cavity 133. The guide rails 136 allow for the grooves 140 (FIG. 15) configured on the underside surface of the table 106 to insert and track along the guide rails 136 such that the table 106 is supported when being moved to and from deployed and stowed positions.

The torsion spring 116 remains in an unloaded position when the table 106 is deployed. The cam 118 returns to a locked orientation due to the force being applied by the extension spring 115 and the cam rod 114 shifting downward due to the lid 102 returning to an open position. FIG. 8 provides an optimal view of the linear guide channel 111 and the siding 113 used to create a channel in which the pivot mount 117 of pivot plate 103 slides or tracks upwards and downwards for the table 106 to move from stowed to deployed positions. The linear guide channel 111 is substantially vertically straight from top to bottom which may allow for a user to experience a consistent feel when operating the table deployment mechanism 100.

Figure 9:
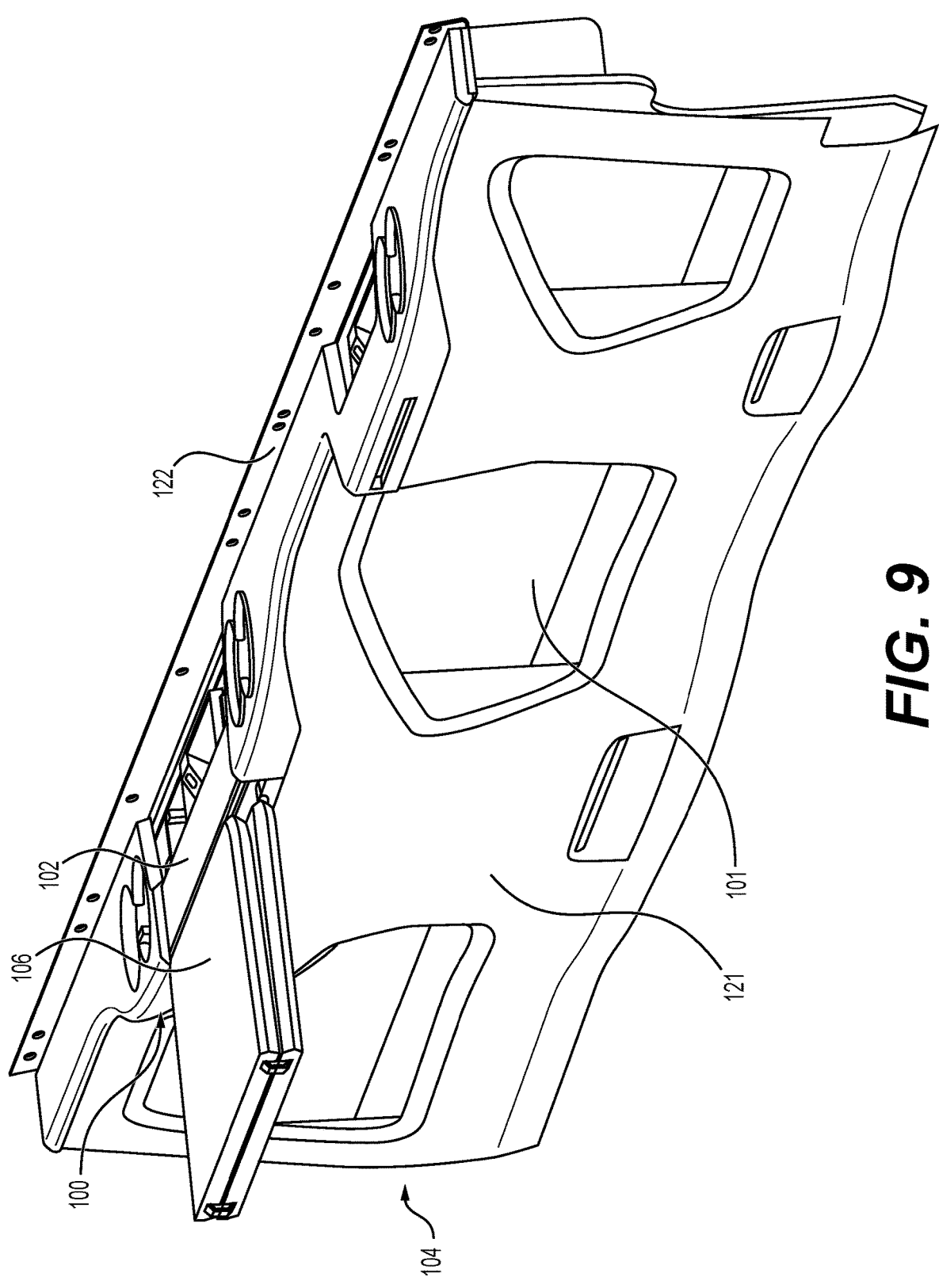
FIG. 9 is a side perspective view of the aircraft side ledge table deployment system with the table in a partially deployed position and the lid closed.

Shown in FIG. 9 is a view where the table 106 is in a partially deployed position with the lid 102 pivoted to a closed position.

Figure 10:
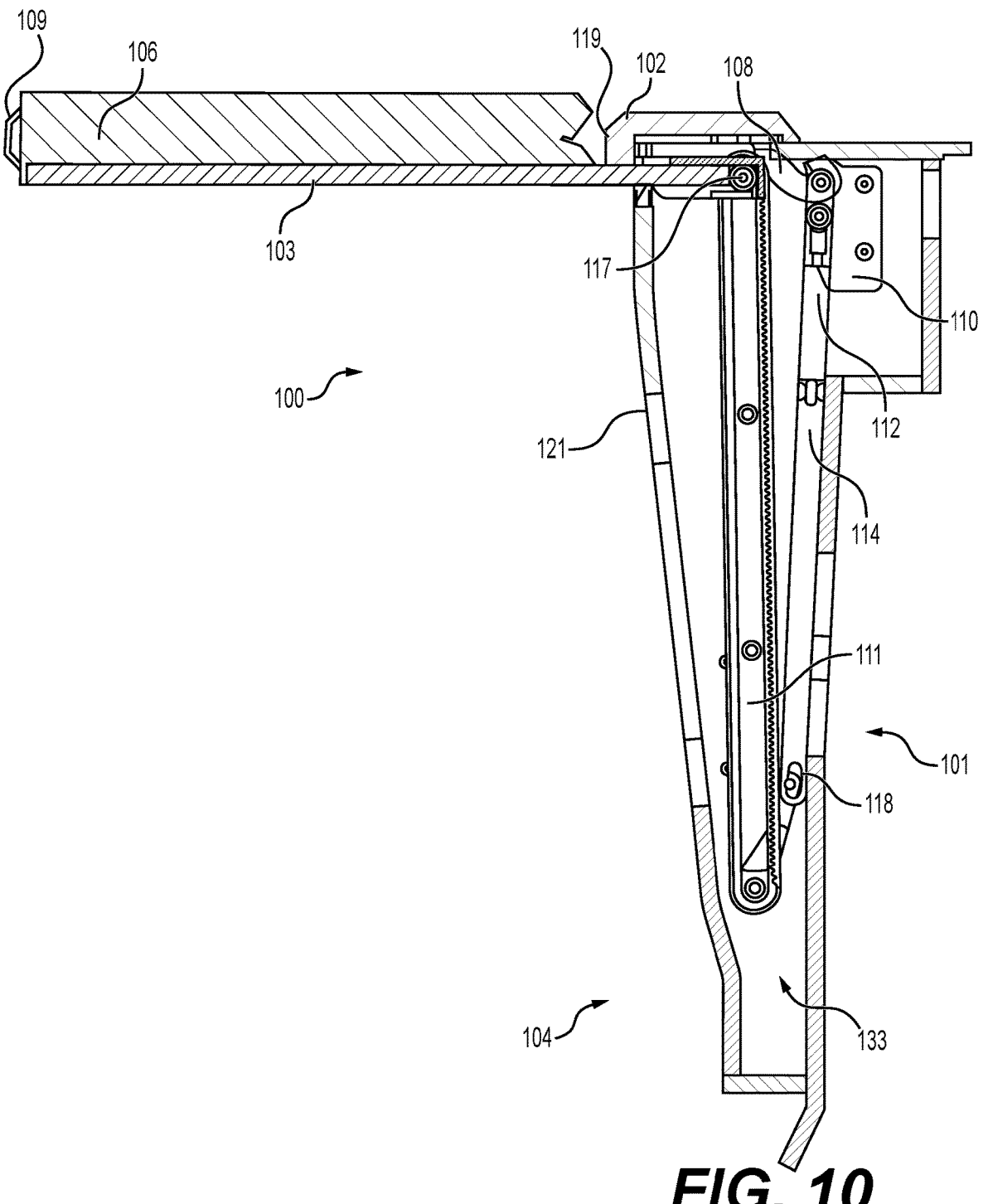
FIG. 10 is a cross sectional view of the aircraft side ledge table deployment system of FIG. 1 with the table in a partially deployed position and the lid closed.

Shown in FIG. 10 is a cross sectional view where the table 106 is in a partially deployed position with the lid 102 pivoted to a closed position. The lid arm 108 is pivoted downwards closing the lid 102 with assistance from the damper housing 112.

Shown in FIG. 11 the table 106 is shown in a fully deployed position with the lid 102 remaining closed. The hinges 109 allow for the table extension 107 to be rotated and made coincident with the table 106 to create a larger usable surface for the table 106.

In operation, beginning from a stowed position the table deployment mechanism 100 may be used to deploy the table 106. While the lid 102 is in a closed position the cam 118 prevents the table 106 from popping up due to the torque in the torsion spring 116. The cam 118 is held in a locked orientation due to the tension in the extension spring 115. To deploy the table 106 a user pivots the lid 102 to an open position. The damper housing 112 assists the user opening the lid 102 and ensures the lid 102 reaches a fully open position. To deploy the table 106 the lid 102 is forced by a user to a position past the open position. When moved past the open position the lid arm 108 mounted to the lid 102 pulls the cam rod 114 upwards which pivots the cam 118 to an unlocked orientation allowing the torsion spring 116 to unload and driving the pivot mount 117 and the connected pivot plate 103 upwards in the linear guide channel 111. The upward translation of pivot plate 103 causes the table 106 to partially protrude out from the aircraft side ledge 104 so that a user may grasp the table 106 possibly using the pull point 142. A user may then grasp and pull the table 106 upwards and outwards along the guide rails 136 until pivot plate 103 and pivot mount 117 reach the top of the channel created by the siding 113 of the linear guide channel 111. At this position pivot plate 103 is orientated substantially perpendicular to the linear guide channel 111 and the table 106 extends longitudinally out from the aircraft side ledge 104 while being supported by the pivot mount 117 and the edge support 120. The table extension 107 is then able to be rotated out of its folded position using the hinges 109 to be substantially coincident to the hinged end of the table 106.

To return the table 106 to its stowed orientation the table extension 107 is rotated back to its folded position. Then the lid 102 may be opened (if closed) and the table 106 lifted and slid back into the cavity 133 within the aircraft side ledge 104. As the table 106 is being lifted pivot plate 103 and pivot mount 117 track down the linear guide channel 111. As the pivot mount 117 is tracked down the linear guide channel 111 the torsion spring 116 interacts and is tensioned and returns to a loaded position. Once the table 106 is fully inside of the aircraft side ledge 104 the tabbed end 208 of the cam 118 is in a locked orientation and prevents the table 106 from deploying. The lid 102 is closed with the assistance of the damper housing 112. Once the lid 102 is closed, the cam rod 114 becomes reengaged and prevents the table from deploying due to the torque in the torsion spring 116. The cam 118 also returns to a locked position.

Figure 16:
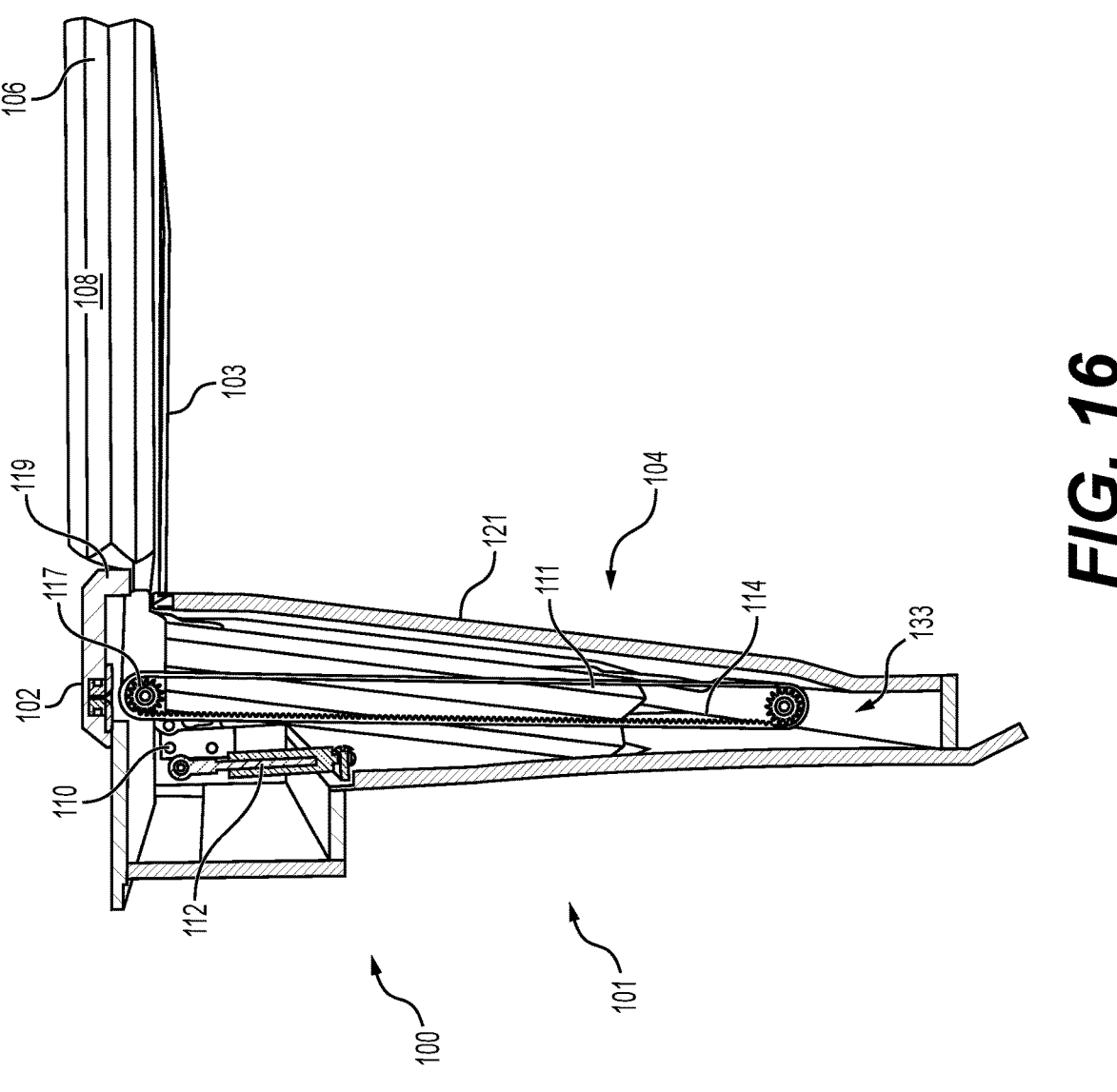
FIG. 16 is a cross-sectional view showing the opposite side of the aircraft side ledge table deployment system of FIG. 1.

FIG. 16 is a cross sectional view revealing the opposite side of the table deployment mechanism 100. The components and arrangements described in embodiments and shown in FIGS. 1-15 are included in similar configurations to the ones shown in FIG. 16. For instance, in the table deployment mechanism 100, linear guide channels 111, cam rods 114, and pivot mounts 117 are positioned on opposing ends of the pivot plate 103 and table 106 substantially providing support for the table 106 while in the cavity 133 and while moving to stowed and deployed positions.

FIG. 17 provides an internal view of the table deployment mechanism 100 with the inboard furniture panel 121 removed. The pivot plate 103 is mounted to the underside of the table 106 such that the pivot mounts 117 on either side of the pivot plate 103 engage with the linear guide channels 111. The grooves 140 on the underside of the pivot plate 103 track along the guide rails 136 to support and align the table 106 moving from stowed to deployed positions.

Many different arrangements of the various components depicted, as well as components not shown, are possible without departing from the spirit and scope of what is claimed herein. Embodiments have been described with the intent to be illustrative rather than restrictive. Alternative embodiments will become apparent to those skilled in the art that do not depart from what is disclosed. A skilled artisan may develop alternative means of implementing the aforementioned improvements without departing from what is claimed.

It will be understood that certain features and subcombinations are of utility and may be employed without reference to other features and subcombinations and are contemplated within the scope of the claims. Not all steps listed in the various figures need be carried out in the specific order described.

What is claimed is:

1. An aircraft table deployment system comprising:
a lid arm operatively connected on a first end to a lid and on a second end pivotally connected to a first end of a cam rod;
the cam rod being pivotally connected on a second end to a pivotally mounted cam;
a table supported in between a first linear guide channel and a second linear guide channel wherein the first linear guide channel and the second linear guide channel are linearly aligned and directly oppose each other;
the table being operatively connected to at least one torsion spring wherein the torsion spring forces the table to a deployed position;
the lid pivoting to a past open position and pivoting the cam allowing the torsion spring to drive the table to the deployed position.

2. The deployment system of claim 1 wherein the first linear guide channel and the second linear guide channel each include siding wherein the siding forms the sides of the first and second linear guide channels.

3. The deployment system of claim 1 wherein the table is supported by a pivot plate and the pivot plate includes a pivot mount configured to track within siding of the first and second linear guide channels.

4. The deployment system of claim 3 wherein the siding and the pivot mount may or may not include gear teeth configured to track the pivot mount within the first and second linear guide channels.

5. The deployment system of claim 3 wherein the torsion spring drives the pivot mount along the first and second linear guide channels such that the table escapes a cavity to be oriented by a user to a stowed position, partially deployed position, or fully deployed position.

6. The deployment system of claim 1 wherein the first and second linear guide channels are shaped to track the table in a single plane from a stowed position to a deployed position.

7. The deployment system of claim 1 wherein an extension spring is mounted to the cam and positions the cam to engage with the table.

8. The deployment system of claim 1 wherein a damper allows the lid to pivot to a closed position, an open position, and the past open position.

9. The deployment system of claim 1 wherein the table is supported and concealed within a cavity.

10. The deployment system of claim 9 wherein the cavity is mounted to an aircraft structure.

11. An aircraft working surface deployment system, the system comprising:
a working surface wherein the working surface is concealed within a cavity and supported by a linear guide channel aligned in a single plane;
the working surface being operatively coupled to at least one torsion spring wherein the torsion spring forces the working surface to escape from the cavity;
a cam pivotally mounted to the linear guide channel wherein the cam pivots to locked and unlocked orientations;
the cam being pivoted to an unlocked orientation when a lid is pivoted to a past open position allowing the torsion spring to force the working surface to escape from the cavity; and
a cam rod operatively connected at a first end to the lid and pivotally mounted at a second end to the cam.

12. The deployment system of claim 11 wherein the cam includes a tabbed end configured to engage with the working surface when the cam is in a locked orientation.

13. The deployment system of claim 11 wherein the working surface is supported by a pivot mount and a lip extension when fully removed from the cavity.

14. The deployment system of claim 11 wherein the working surface is stabilized by guide rails when the working surface is being removed from the cavity.

15. The deployment system of claim 11 wherein the cavity is formed within an inboard furniture panel.

16. An aircraft working surface deployment system, the system comprising:
a lid operatively connected to a cam rod wherein the lid is operatively connected to a first end of the cam rod;
a cam pivotally mounted to a second end of the cam rod wherein the cam is engaged with a working surface in a locked orientation;
the working surface supported by a linear guide channel wherein the working surface tracks along the linear guide channel in a single plane;
the lid being able to pivot to a past open position to shift the cam rod and pivot the cam to disengage with the working surface in an unlocked orientation.

17. The deployment system of claim 16 wherein a first pivot mount and a second pivot mount engage with the linear guide channel on opposing sides wherein the first pivot mount is positioned on one side of a pivot plate and the second pivot mount is positioned on an opposite side of the pivot plate.

18. The deployment system of claim 17 wherein the pivot plate is mounted to an underside of the working surface.

19. The deployment system of claim 16 wherein at least one torsion spring drives the working surface out of a cavity when the cam is pivoted to an unlocked orientation.

* * * * *